United States Patent [19]

Kubota et al.

[11] E Re. 28,774

[45] Reissued Apr. 13, 1976

[54] WHITE BALANCE CONTROL SYSTEM

[75] Inventors: Yasuharu Kubota, Chigasaki; Takashi Shiono, Tokyo, both of Japan

[73] Assignee: Sony Corporation, Tokyo, Japan

[22] Filed: Feb. 14, 1965

[21] Appl. No.: 332,278

Related U.S. Patent Documents

Reissue of:

[64] Patent No.: 3,627,911
Issued: Dec. 14, 1971
Appl. No.: 12,070
Filed: Feb. 17, 1970

[30] Foreign Application Priority Data

Jan. 17, 1970 Japan ..... 44-13409

[52] U.S. Cl. ..... 358/29
[51] Int. Cl.[2] ..... H04N 9/00
[58] Field of Search ..... 178/5.4 BT; 358/29

[56] References Cited

UNITED STATES PATENTS

| | | | |
|---|---|---|---|
| 3,457,362 | 7/1969 | Mackey et al. | 178/5.4 |
| 3,479,448 | 11/1969 | Kollsman | 178/5.4 BT |

*Primary Examiner*—George H. Libman
*Assistant Examiner*—George G. Stellar
*Attorney, Agent, or Firm*—Lewis H. Eslinger; Alvin Sinderbrand

[57] ABSTRACT

A white balance control system which has two amplifiers for red and blue video signals, two memory circuits for selecting the gains of the amplifiers in response to signals applied thereto, and two comparator circuits for comparing a green video signal with the red and blue video signals, respectively. The compared signals are respectively applied to the memory circuits selectively.

7 Claims, 4 Drawing Figures

INVENTOR.

YASUHARU KUBOTA
TAKASHI SHIONO

BY

ATTORNEYS

INVENTOR.

YASUHARU KUBOTA
TAKASHI SHIONO

BY

ATTORNEYS

WHITE BALANCE CONTROL SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a white balance control system, and more particularly to a system for easy and accurate control of the white balance of the video signal of color television cameras.

2. Description of the Prior Art

In color television cameras, the white balance is lost generally by changes in color temperature of illumination for an object to be televised, or by secular change of video amplifiers or other components of the image pickup tube due to variations in temperature or the like. It is the practice in the prior art while televising a white object, to control the gains of gain control circuits provided in all or in two of the amplifiers for the red, green and blue video signals in a manner to retain the signals at substantially the same level. However, control of each color exerts a influence upon the balance of the other two colors, so that accurate adjustment of the white balance is difficult and the operation [ therefor ] *therefore* is troublesome.

SUMMARY OF THE INVENTION

In the white balance control system of this invention a gain control stage is provided in each of the two amplifiers for three primary color video signals and the output levels of two of the three color video signals are simultaneously adjusted relative to that of the other remaining one. Consequently, when a white object is televised, the white balance is automatically adjusted in accordance with illumination of the object. Further, memory circuits are provided for maintaining the optimum gains of the amplifiers, so that an object can be televised with the white balance being well adjusted. Since control of the gain control stages of the amplifiers is achieved only at the time of operation of a manual switch, adjustment of the white balance can be readily carried out by the manual switch.

DESCRIPTION OF THE PREFERRED EMBODIMENTS

Figure 1:
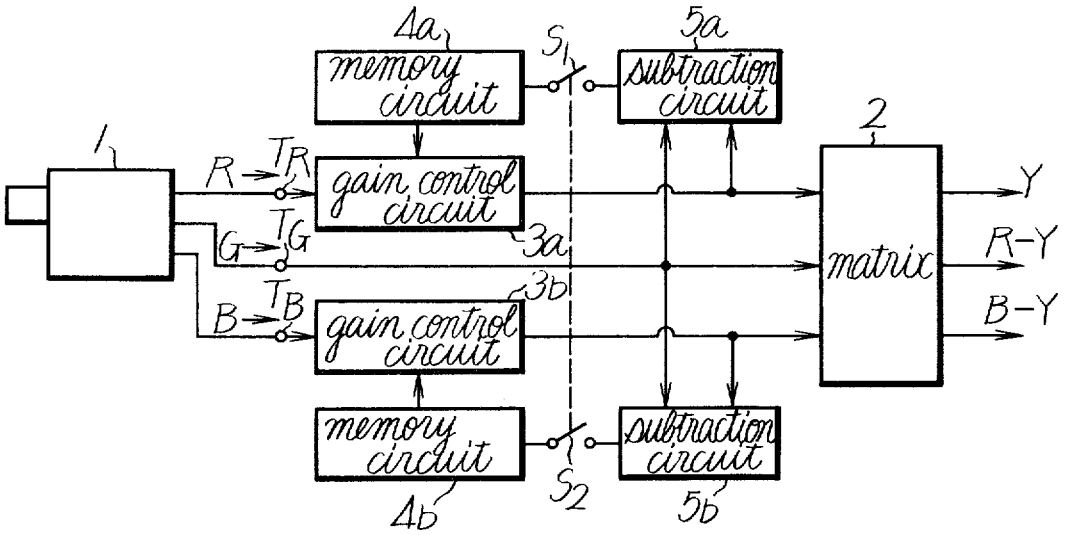
FIG. 1 is a block diagram showing one embodiment of the white balance control system of this invention.

In FIG. 1 reference numeral 1 indicates a color television camera, from which are derived, at its output terminals $T_R$, $T_G$ and $T_B$, red, green and blue video signals R, G and B, and these color video signals are respectively supplied through transmission lines to a matrix circuit 2, from the output side of which are derived color difference signals R–Y and B–Y and a luminance signal Y.

In the red and blue signal transmission lines there are provided gain control circuits 3a and 3b and memory circuits 4a and 4b for supplying them with control signals to hold their conditions. In this case the memory circuits 4a and 4b are supplied with compared outputs of the color signals through interlocking manual normally open switches $S_1$ and $S_2$ from subtraction circuits 5a and 5b including integration circuits. More specifically, the memory circuit 4a disposed on the side of the red signal system is supplied with the compared output of the red and green signals R and G, while the memory circuit 4b provided on the side of the blue signal system is supplied with the compared output of the blue and green signals B and G.

Figure 2:
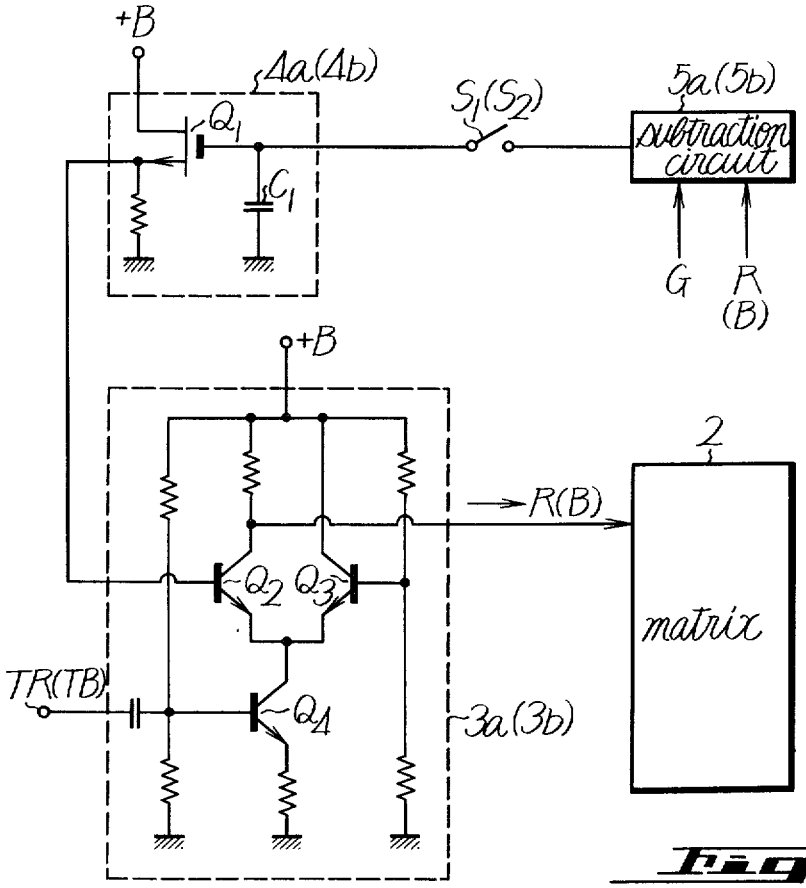
FIG. 2 is a circuit connection diagram showing the principal part of the system illustrated in FIG. 1.

In response to one on-off operation of the manual switches $S_1$ and $S_2$, the memory circuits 4a and 4b memorize the compared outputs derived from the subtraction circuits 5a and 5b at that time and after the switches $S_1$ and $S_2$ are turned off, the circuits 4a and 4b remain unchanged and control the gain control circuits 3a and 3b at the memorized level. FIG. 2 shows concrete circuit connections for this purpose, in which the memory circuits 4a and 4b are each made up of a memory capacitor $C_1$ and a field effect transistor (hereinafter referred to as FET) $Q_1$. In order for the FET $Q_1$ to provide a higher input impedance, the FET $Q_1$ is constructed in the source-follower form and the memory capacitor $C_1$ is connected between its gate and ground. With such an arrangement, the gate input impedance of the FET $Q_1$ is approximately $10^{10}$ ohms and, when the capacitor $C_1$ is supplied with charge through the manual switch $S_1$ ($S_2$), the capacitor $C_1$ stores the charge for a long time and memorizes its level.

The source output of the FET $Q_1$ is applied to the gain control circuit 3a (3b), which is, for example, a differential amplifier [-] type gain control circuit consisting of transistors $Q_2$, $Q_3$ and $Q_4$ and in which the base of the transistor $Q_2$ is supplied with the source output of the FET $Q_1$.

Thus, the polarities of the compared outputs of the subtraction circuits 5a and 5b are selected in accordance with the level difference of the color video signals applied thereto. In the red signal system, the polarity of the compared output of the subtraction circuit 5a is selected such that, when the level of the red signal R is lower than that of the green signal G, the amplification degree of the gain control circuit 3a is increased by the compared output of the subtraction circuit 5a to raise the level of the red signal R applied to the matrix circuit 2. Conversely, when the level of the red signal R exceeds that of the green signal G, the amplification degree of the gain control circuit 3a is decreased to lower the level of the red signal R fed to the matrix circuit 2. Similarly, in the blue signal system, the polarity of the compared output of the subtraction circuit 5b is selected so that, when the blue signal B is lower in level than the green signal G, the amplification degree of the gain control circuit 3b is increased and that in the opposite case it is decreased. Thus, the outputs of both gain control circuits 3a and 3b are controlled so that all the color signals R, G and B supplied to matrix 2 will be at substantially the same level and this condition is memorized by the memory circuits 4a and 4b to maintain the amplification degrees of the gain control circuits 3a and 3b.

When the color television camera 1 picks up the image of an object which is reproduced in white in its entirety, the color signals derived at the output terminals $T_R$, $T_G$ and $T_B$ should [to] be at the same level. If each color signal is different in level from the others, the red and blue signals R and B are simultaneously compared by the subtraction circuits 5a and 5b with the green signal G and the resulting compared outputs are respectively memorized in the memory circuits 4a and 4b by the closing operation of the switches $S_1$ and $S_2$. The gain control circuits 3a and 3b are controlled at the memorized level, by which the color signals R, G and B supplied to the matrix circuit 2 are rendered substantially equal in level to one another and are held at that level.

Consequently, in accordance with this invention the white balance in the camera can be adjusted and held in the adjusted condition only by closing the switches $S_1$ and $S_2$ while picking up the image of an object to be reproduced in white.

Figure 3:
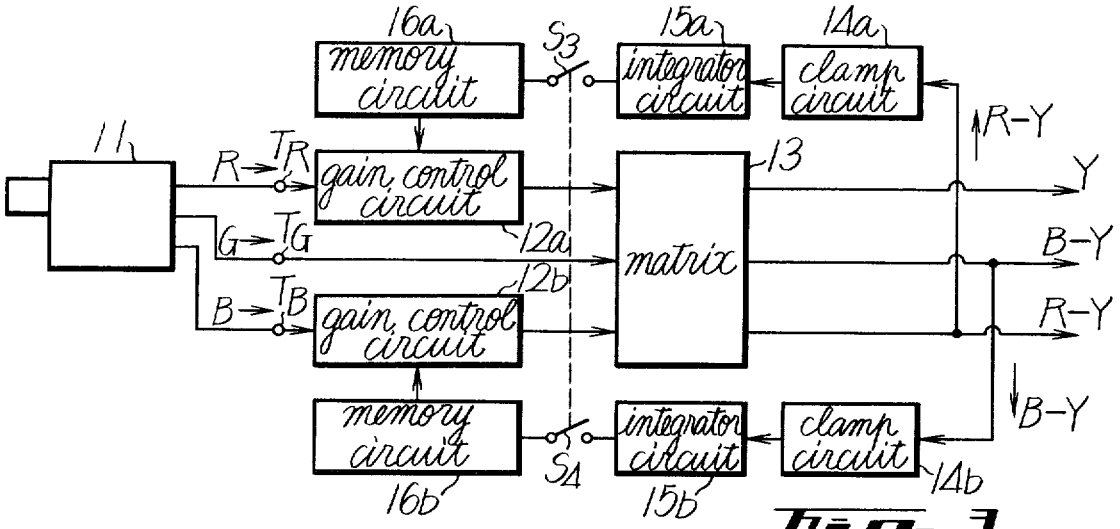
FIG. 3 is a block diagram showing another embodiment of this invention.
Figure 4:
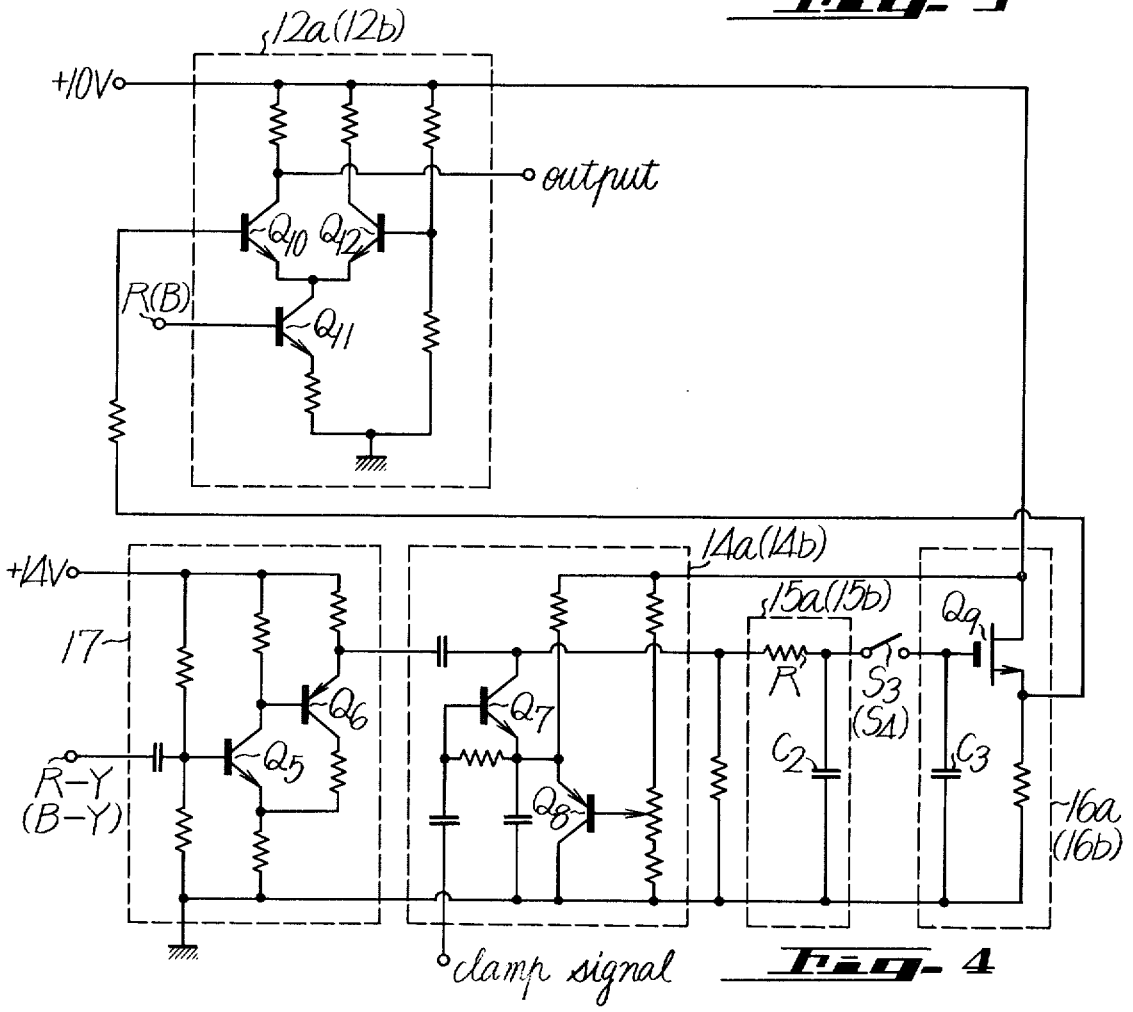
FIG. 4 is a circuit connection diagram showing the principal part of the system depicted in FIG. 3.

The white balance adjustment can be achieved by reducing, for example the color difference signal to zero. FIG. 3 is a circuit connection diagram of one example of such a method and FIG. 4 shows its principal circuit connections. The red and blue video signals derived from a color television camera 11 are applied to a matrix circuit 13 through gain control circuits 12a and 12b, while the green video signal is fed directly to the matrix circuit 13, from which are derived a luminance signal Y and color difference signals B–Y and R–Y. The color difference signal R–Y is supplied through a clamp circuit 14a, an integration circuit 15a and a switch $S_3$ to a memory circuit 16a which controls the gain control circuit 12a. The other color difference signal B–Y is similarly applied through a clamp circuit 14b, an integration circuit 15b and a switch $S_4$ to a memory circuit 16b which controls the gain control circuit 12b. The clamp circuits 14a and 14b are provided for eliminating a level change resulting from a change of the dark current in the image pickup tube.

In practice, the above circuits are constructed, for example, as shown in FIG. 4, in which case, however, an amplifier 17 consisting of transistors $Q_5$ and $Q_6$ is provided to amplify the color difference signal R–Y before it is applied to the clamp circuit 14a.

In the event that the image of a white object is picked up by the camera 11 and the switches $S_3$ and $S_4$ are turned on, the color difference signal R–Y amplified by the amplifier 17 is supplied to the clamp circuit 14a. A transistor $Q_7$ of the clamp circuit 14a is switched on and off by a clamp signal applied to its base in synchronism with a horizontal synchronizing signal, thereby clamping the color difference signal R–Y at a voltage depending upon the collector voltage of a transistor $Q_8$. The clamped color difference signal R–Y is integrated by the integration circuit 15a and is then applied through the switch $S_3$ to the memory circuit 16a made up of a FET $Q_9$ of the source follower connection.

In the event that the white balance of the output of the matrix circuit 13 is lost, a voltage corresponding to the color difference signal R–Y is charged and maintained by a capacitor $C_3$ connected between the [base] *gate* of the FET $Q_9$ and ground. Accordingly, the gain of the gain control circuit 12a consisting of transistors $Q_{10}$, $Q_{11}$ and $Q_{12}$ is selected and even after the switch $S_3$ has been turned off the selected gain is maintained. Since similar operations are also carried out in connection with the blue signal, white balance can be easily adjusted by a simultaneous operation of the switches $S_3$ and $S_4$ when required.

Although the present invention has been described in connection with the gain control circuits whose amplification degree is controlled, it is possible to use gain control circuits whose attenuation is controlled. Further, it will be readily understood that the memory circuits may be of other connection.

It will be apparent that many modifications and variations may be effected without departing from the scope of the novel concepts of this invention.

We claim as our invention:

1. A white balance control system comprising a first gain control circuit [,] *and* means for applying a first color video signal to the first gain control circuit [,] ; a second gain control circuit [,] *and* means for applying a second color video signal to the second gain control circuit [, means for applying a third color video signal, means for producing a first color difference signal,]; means for producing [a] first *and second* color difference [signal between the first color video signal as received from the first gain control circuit and the third color video signal, means for producing a second color difference signal between the second color video signal as received from the second gain control circuit and the third color video signal,] *video signals and means for applying a third color video signal to said last-named means, said first and second gain control circuits being connected to said last-named means;* a first memory circuit connected to said first gain control circuit for controlling the first gain control circuit [,] ; a second memory circuit *connected to said second gain control circuit* for controlling the second gain control circuit, *said first and second memory circuits respectively comprising first and second capacitors connected to have signals derived from said first and second color difference signals, respectively, applied thereto, and field effect transistors having gate electrodes connected to said capacitors to memorize the signals applied to said capacitors;* and means for selectively applying the first and second color difference *video* signals to the first and second memory circuits, respectively, the first and second memory circuits storing the color difference signals applied thereto for maintaining constant the gains of the first and second gain control circuits.

[2. A white balance control system as claimed in claim 1 wherein the first and second memory circuits respectively comprise field effect transistors and memorize the color difference signals in capacitors connected to the gates of the transistors.]

3. A white balance control system as claimed in claim [2] *1* wherein the field effect transistors are [of the] *connected as* source [follower connection] *followers* and supply their source voltages to the respective gain control circuits.

4. A white balance control system as claimed in claim 1 wherein the first, second and third [color] video signals are each any one of red, blue and green signals.

5. A white balance control system as claimed in claim 4 wherein the [first and second] color difference *video* signal producing means are first and second subtraction circuits [, respectively].

6. A white balance control system [as claimed in claim 4 which is provided with] *comprising a first gain control circuit and means for applying a first color video signal to the first gain control circuit; a second gain control circuit and means for applying a second color*

*video signal to the second gain control circuit;* a matrix circuit for producing R–Y and B–Y *color difference* signals [,] *and means for applying a third color video signal to said matrix circuit, said first and second gain control circuits being connected to said matrix circuit; a first memory circuit connected to said first gain control circuit for controlling the first gain control circuit; a second memory circuit connected to said second gain control circuit for controlling the second gain control circuit; and means for selectively applying* the R–Y and B–Y signals [ being supplied ] to the first and second memory circuits, *respectively, the first and second memory circuits storing the color difference signals applied*

*thereto for maintaining constant the gains of the first and second control circuits.*

7. A white balance control system as claimed in claim 6 wherein the first and second memory circuits [ are ] each [ provided with ] *comprises* a clamp circuit and an integration circuit.

8. A white balance control system as claimed in claim 1 wherein the color difference *video* signal applying means are actuated when [ the image of a white object is picked up ] *said first, second, and third color video signals are related to each other in magnitude in correspondence with a predetermined white level ratio.*

* * * * *